March 7, 1944. W. W. PAGET 2,343,793
CORE BREAKING AND WITHDRAWING APPARATUS
Filed Aug. 3, 1940 2 Sheets-Sheet 1
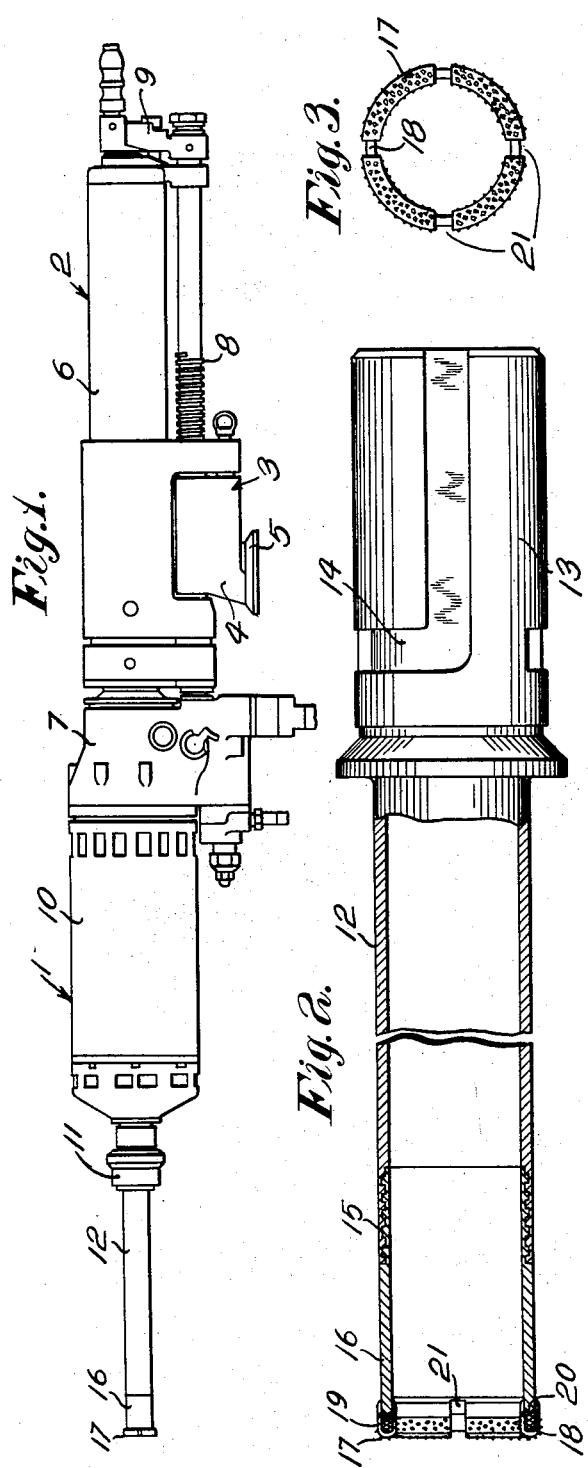
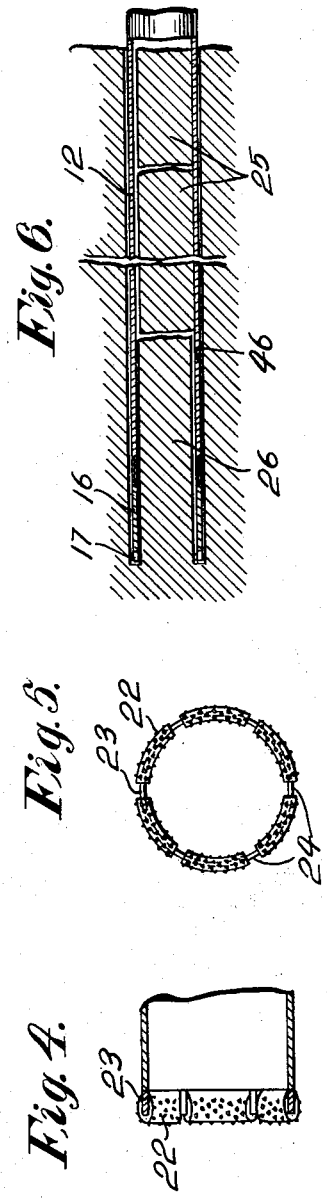
Inventor:
Wm W. Paget
by
Louis A. Maxson
Attorney.

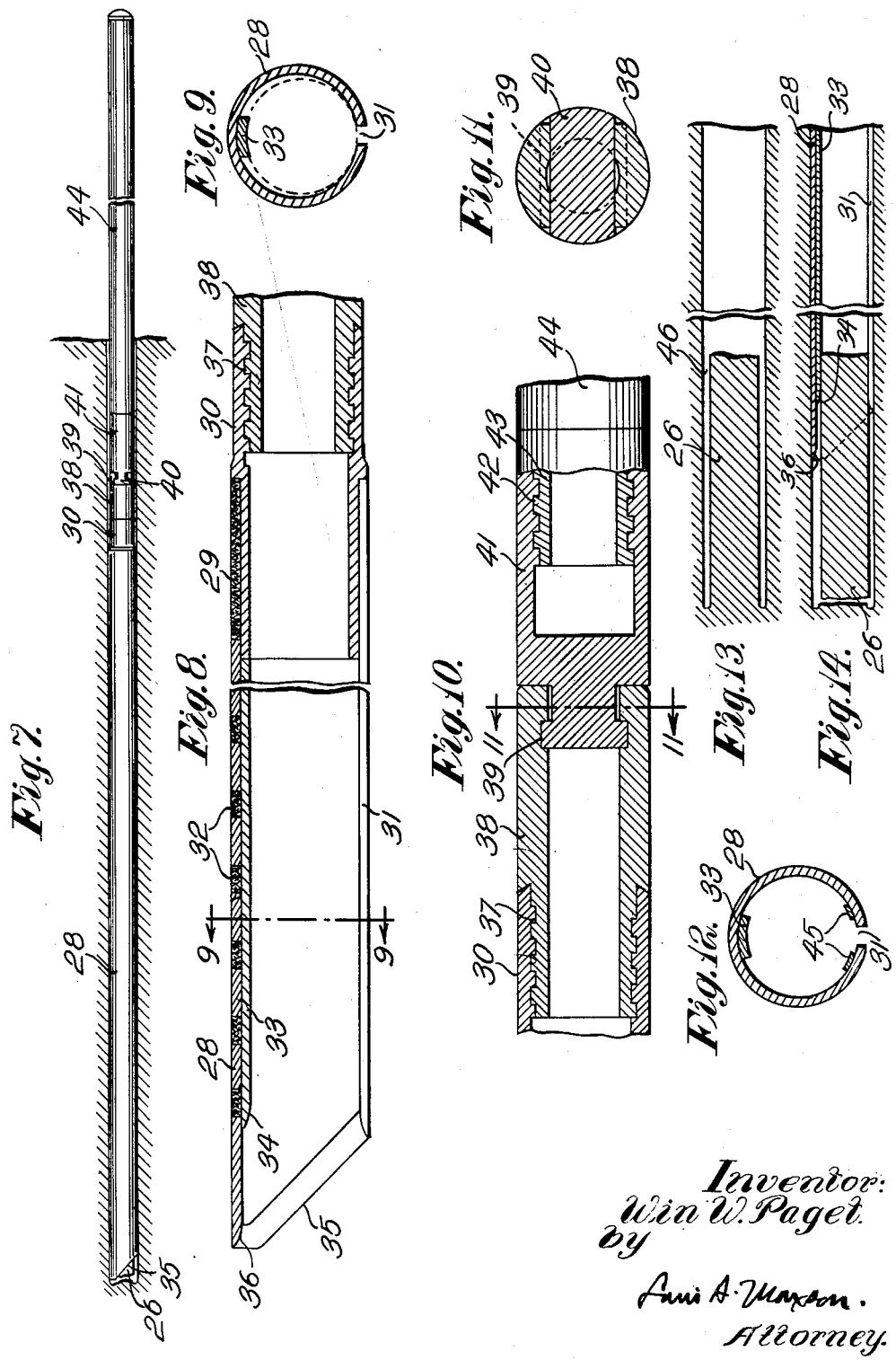

Patented Mar. 7, 1944

2,343,793

UNITED STATES PATENT OFFICE 2,343,793

CORE BREAKING AND WITHDRAWING APPARATUS

Win W. Paget, Michigan City, Ind., assignor to Sullivan Machinery Company, a corporation of Massachusetts Application August 3, 1940, Serial No. 350,632

3 Claims. (Cl. 255—72)

This invention relates to apparatus for breaking and withdrawing cores that have been cut free laterally from the surrounding rock of which they originally formed a part.

In core drilling apparatus a rotary core bit of annular form is employed to cut an annular kerf in the material being drilled and as drilling progresses a cylindric core is formed which, in most cases, breaks off in fragments as the hole deepens, and the core fragments are received in a tubular core barrel to which the core bit is attached. In high speed core drills the core bits are usually relatively small in size and thin walled, and the annular kerfs cut thereby are relatively narrow so that there is not room for a usual built-in core breaker such as is usually arranged within the core barrel or bit of a conventional core drill, and with the use of such thin-walled bits and barrels there is usually left at the bottom of the drill hole a short undetached core section which must be mechanically removed by means other than the core barrel and bit. Since there is not room for a usual core breaker it is necessary to provide a separate core breaker tube which is inserted in the drill hole after the core barrel and bit have been removed therefrom, and by means of this separate core breaker tube the undetached fragment of core left at the hole bottom is broken off and removed from the hole.

An object of the present invention is to provide an improved core breaker which is separate from the core bit and barrel which drill the annular kerf surrounding the core, and which is insertible in the annular bore after the removal of the core bit and barrel, for breaking off the undetached core at the bottom of the drill hole. Yet another object is to provide an improved core breaker tube having means for breaking off the undetached core with a laterally applied wedging action and means for frictionally gripping the broken off core fragment. Other objects and advantages of the invention will, however, hereinafter more fully appear in the course of the ensuing description.

This application discloses and claims in its broadest claim inventive subject matter generic to its own disclosure and that of Figs. 32 and 33 of my copending application Serial No. 268,792, filed Apr. 19, 1939, now Patent No. 2,288,541, granted June 30, 1942.

In the accompanying drawings there are shown for purposes of illustration one form and a modification of my improved core breaking means.

In these drawings:

Fig. 1 is a side elevational view of a high speed rotary drilling apparatus utilized in the drilling of an annular hole.

Fig. 2 is a longitudinal sectional view taken through a core bit and barrel, with parts shown in side elevation.

Fig. 3 is an elevational view of the cutting end of the core bit shown in Fig. 2.

Fig. 4 is a fragmentary sectional view taken in the plane of Fig. 2, illustrating a modified form of bit and barrel construction.

Fig. 5 is a front end elevational view of the bit shown in Fig. 4.

Fig. 6 is a diagrammatic view showing the core barrel and bit in drilling position in a drill hole and illustrating the manner of cutting and removing the core.

Fig. 7 is a side elevational view of the improved core breaker showing the same in core breaking position in a drill hole.

Fig. 8 is a longitudinal sectional view taken through the improved core breaker tube.

Fig. 9 is a cross sectional view taken on line 9—9 of Fig. 8.

Fig. 10 is a longitudinal sectional view taken through the improved detachable coupling between the breaker tube and handle.

Fig. 11 is a cross sectional view taken on line 11—11 of Fig. 10.

Fig. 12 is a view similar to Fig. 9, showing a slightly modified construction.

Fig. 13 is a diagrammatic view showing a portion of the undetached core at the bottom of a drill hole.

Fig. 14 is a diagrammatic view showing the core breaker tube in its core breaking and gripping position in a drill hole.

For the formation of an annular kerf and the cutting of a core there may be used a drilling apparatus of the high speed rotary type adapted for use with core type bits and generally comprising bit rotation means generally designated 1, drill bit feeding means generally designated 2 and drill guiding and supporting means generally designated 3. It will be understood, however, that rotary drilling apparatus of various other types may be used.

The supporting and guiding means 3 comprises a trunnion member 4 having a swivel plate 5 adapted to be clamped in the saddle mounting of a mine column or other suitable support. The trunnion member slidingly supports a feed cylinder 6 of a hydraulic feeding means, the cylinder containing a usual reciprocable feed piston having its piston rod projecting forwardly and supporting at its forward end a control head 7. Associated with the hydraulic feeding means is manual feeding means including a feed screw 8 operated by a hand crank 9, for manually feeding the feed cylinder relative to the trunnion member. The rotation means 1 includes a rotary motor 10 having secured to its power shaft a chuck 11. As the details of this drilling apparatus do not enter into this invention and are fully described in the copending application Serial No. 268,792 above referred to, further description and illustration thereof are unnecessary.

For the actual cutting or drilling of the rock to form the core, structure such as is shown in Figs. 2 and 3 may be used. It will be noted in Figs. 2 and 3 that a cylindric tubular core barrel 12 has an integral shank 13 insertible within the chuck 11 of the drilling apparatus and having locking grooves 14 for suitably locking the shank within the chuck 11. Threadedly secured as at 15 or otherwise attached to the core barrel 12 is a cylindric core drill bit 16. The barrel and bit are formed of thin-walled tubes and the annular cutting portion 17 of the drill bit is secured to the bit tube in an improved manner as will now be described. The annular cutting portion of the bit may be composed of a mixture of powdered metal and diamond fragments or other abrasive particles and be formed under heat in a matrix at a sintering temperature, thereby to provide a molded diamond or other abrasive impregnated annulus 18. The end of the thin-walled tube of the drill bit is annularly grooved at 19 to provide a greater surface area, and concurrently with the sintering process the bit annulus is brazed or otherwise integrally fixed at 20 to the thin-walled bit tube. Between the cutting elements are formed appropriate grooves 21 for the passage of water to the bit. In Figs. 4 and 5 a somewhat modified but structure is shown. In it the diamond-impregnated cutting elements 22 are attached to an annulus 23 of the same size and thickness as the bit tube and brazed or otherwise integrally fixed to the tube. These diamond-impregnated cutting elements are spaced apart by appropriate water grooves 24. It will be appreciated that these core cutting and receiving devices are but illustrative of the various ones that can be used.

As the core drill bit penetrates the relatively hard rock or similar material, a cylindric core is formed, and as drilling progresses the core, due to its own weight, quite often breaks off in fragments, as indicated at 25 in Fig. 6. These fragments are received within the core barrel, and when the bit and barrel are withdrawn from the hole the core fragments are removed from the hole with the bit and barrel, within the latter. Due to the relatively small size bit, the annular kerf cut thereby is relatively narrow so that there is not room for a usual core breaker arranged within the barrel or bit, so that it is necessary to provide a separate core breaker which is inserted within the drill hole after the core barrel and bit have been removed, and by means of this separate core breaker the undetached fragment of core, indicated at 26 in Fig. 6, at the hole bottom may be broken off and removed from the hole.

As shown in Figs. 8 and 9, my improved core breaker comprises a core-receiving tube 28 having secured thereto, as by welding, as at 29, a head 30. The tube 28 is provided with a narrow longitudinal slot 31 extending throughout its length to permit the sides of the tube to yield slightly as the detached core fragments are received within the tube, thereby frictionally to grip the core; and secured, as by brazing, as at 32, at the side of the tube opposite from the slot and extending longitudinally along the inner wall of the tube is a wedge member 33 having its forward end beveled at 34. As shown in Fig. 8, one side of the tube is angularly cut away at 35 and the forward end of the tube walls are flared, as by chamfering at 36, to facilitate insertion of the core breaker within the annular kerf cut by the core bit and to direct the core within the tube. The head 30 is internally threaded at 37 to receive a coupling member 38 and the latter is formed with a transverse groove 39 of T shape in cross section slidingly to receive the T-shaped head 40 of a coupling member 41. The coupling member 41 is internally threaded at 42 to receive a coupling member 43 secured to an elongated tubular handle 44 by means of which the core breaker may be easily manipulated. In the modification shown in Fig. 12, the core breaker tube has secured thereto, in addition to the wedge 33, a pair of ledge-like elements or pads 45 secured to the inner wall of the tube at the opposite sides of the slot 31, in the manner shown. These ledges or pads cooperate with the wedge 33 in frictionally gripping the core fragments. It is evident that when the core breaker tube is inserted in the annular kerf indicated at 46 in Fig. 13, the wedge 33 acts laterally on the undetached core section 26 with a wedging action to apply a breaking pressure to the core, in the manner shown in Fig. 14. As the core breaker tube is forced inwardly within the hole, the core may be completely broken off and received within the core breaker tube, the slotted side walls of the tube yielding slightly, frictionally to grip the core; and upon withdrawal of the tube from the drill hole the core fragment is retained within the breaker tube and is thereby removed from the hole. In Fig. 7 the core breaker tube is shown in core breaking position within the drill hole, and when thus disposed the T-shaped head 40 is prevented from undesired lateral release from the slot 39 by the walls of the drill hole. The feature of frictionally gripping the core fragment is of particular importance when removing the core fragments from a drill hole which is inclined downwardly with respect to the horizontal.

An improved core breaking device is provided whereby the undetached core at the bottom of the drill hole may be removed by the insertion of the breaking device within the narrow annular kerf cut by the drill bit, the core breaker being inserted in the drill hole after the removal of the core bit and barrel from the hole. It will further be noted that there is provided an improved implement for breaking loose the undetached core at the bottom of the drill hole with a laterally applied wedging action, and novel means for frictionally gripping the detached core section. Other uses and advantages of the invention in its various aspects herein disclosed and claimed will be clearly apparent to those skilled in the art.

While there are in this application specifically described one form and a modification which my invention in core breakers may assume in practice, it will be understood that these are shown for purposes of illustration and that the invention may be further modified and embodied in various other forms without departing from its spirit or the scope of the appended claims.

What I claim as new and desire to secure by Letters Patent is:

1. In an apparatus of the character described, a core breaker adapted for insertion in an annular kerf and comprising a cylindric core-receiving tube adapted to receive the core and having core breaking means for applying a lateral wedging force to the core, said tube formed to provide yieldable side walls which have spaced apart free edges and which are constructed and arranged to yield outwardly relatively to each other to receive a core and thereupon frictionally to grip the core by the inherent resilience of said walls.

2. A core breaker comprising, in combination, a cylindric core-receiving tube insertible in a drill hole and having a bore adapted to receive a core, core breaking and gripping means including an integral projection extending along at least the major part of the length of one wall of the core-receiving bore for applying a lateral breaking pressure to the core in a direction toward the opposite wall thereof, and a longitudinal slot extending along the opposite wall of the core-receiving bore for providing resilient portions adapted frictionally to grip the core broken off by said pressure-applying projection.

3. A core breaking and withdrawing device comprising a generally cylindric core-receiving tube insertible in an annular kerf surrounding a core, said tube having, extending longitudinally along one inner wall of said tube, and, with said tube, presenting a thickness greater than the radial dimension of such kerf, means for applying a lateral wedging force to the core as said tube is inserted in the kerf and for forcing the core toward the opposite wall to effect fracture of the core, and said tube further having, at the side thereof opposite said wedging force applying means and substantially coextensive, longitudinally of the tube, with the effective length of said wedging force applying means, resilient means for frictionally gripping the fractured core as the latter is forced laterally by said wedging means, to retain the core fragment within the tube during withdrawal thereof from the kerf.

WIN W. PAGET.

CERTIFICATE OF CORRECTION.

Patent No. 2,343,793.                                March 7, 1944.

WIN W. PAGET.

It is hereby certified that error appears in the printed specification of the above numbered patent requiring correction as follows: Page 2, first column, line 41, for "but" read --bit--; and second column, line 25, for "tube" read --tube 28--; line 55, strike out "An" and insert instead --As a result of this invention it will be noted that an--; page 3, first column, lines 23 and 24, strike out the words "core breaking and gripping means including"; line 27, and second column, line 1, strike out "in a direction toward the opposite wall thereof"; and that the said Letters Patent should be read with this correction therein that the same may conform to the record of the case in the Patent Office.

Signed and sealed this 16th day of May, A. D. 1944.

(Seal)                                        Leslie Frazer
                                               Acting Commissioner of Patents.